United States Patent [19]
Lai

[11] Patent Number: 5,596,963
[45] Date of Patent: Jan. 28, 1997

[54] STAGE COMBUSTION ROTARY ENGINE

[76] Inventor: Jui H. Lai, No. 171 Long Chung Rd., I-Lan, Taiwan, 260

[21] Appl. No.: 515,059

[22] Filed: Aug. 14, 1995

[51] Int. Cl.$^6$ .................................................. F02B 53/00
[52] U.S. Cl. ........................................ 123/236; 418/258
[58] Field of Search .................................. 123/231, 236, 123/237, 239; 418/258

[56] References Cited

U.S. PATENT DOCUMENTS

| 680,478 | 8/1901 | English et al. | 418/258 |
|---|---|---|---|
| 939,751 | 11/1909 | Schulz | 123/231 |
| 1,385,619 | 7/1921 | Henry | 418/258 |
| 1,864,406 | 6/1932 | Christ | 123/236 |

FOREIGN PATENT DOCUMENTS

| 820673 | 8/1937 | France | 123/239 |
|---|---|---|---|
| 1302568 | 7/1962 | France | 123/236 |
| 3204017 | 8/1983 | Germany | 123/236 |

*Primary Examiner*—Michael Koczo
*Attorney, Agent, or Firm*—Sheldon & Mak

[57] ABSTRACT

An engine having one stage of combustion between a rotary compressor and a rotary motor, and another stage of combustion within the motor, includes compressor and motor vane rotors that rotate in respective housing portions on a common drive shaft; first and second transfer passages fluid connected between respective exhaust ports of the compressor and intake ports of the motor, first and second combustion chambers being formed within the respective transfer passages, the combustion chambers being periodically sequentially pressurized by gas flow from the compressor exhaust ports. First and third cam-actuated poppet valves in the first and second transfer passages prevent upstream gas flow from the respective combustion chambers into the compressor. Second and fourth cam-actuated poppet valves in the first and second transfer passages prevent upstream gas flow from the motor into the respective combustion chambers. An alternating sequence of gas flow in the transfer passages and combustion in the combustion chambers is supportable by operation of the first and second valves and of the third and fourth valves in complementary half-revolutions of the first and second rotors, combustion occurring during expansion of gas from the combustion chamber into the expansion chamber, wherein the output shaft is powered by combustion in the combustion chambers and further by combustion in the expansion chamber.

11 Claims, 2 Drawing Sheets

STAGE COMBUSTION ROTARY ENGINE

BACKGROUND

The present invention relates to combustion engines, and more particularly to rotary engines including engines having sliding vane rotors.

Rotary gas devices such as compressors, motors, and engines are known in the prior art as alternatives to corresponding reciprocal piston-type machines. Traditionally the rotary devices have avoided the problems associated with reciprocating mechanisms; however, rotary engines have not been widely used because they are particularly subject to ineffective sealing and lubrication and consequent excessive wear and foreshortened useful life.

Apart from the well known disadvantages of reciprocating mechanisms, a relatively recently recognized disadvantage of piston engines is characterized by the traditional Otto cycle wherein combustion mainly occurs at constant volume, producing very high pressures and temperatures and consequent significant air pollution by emissions of $No_x$. Accordingly, some continued development of rotary engines has been directed to reducing harmful emissions by limiting combustion temperatures and pressures. For example, U.S. Pat. No. 3,961,485 to Wiley discloses a vane type rotary engine using exhaust from a multichamber Otto cycle engine to power a Sterling cycle engine on the same shaft. Nevertheless, rotary engines remain without widespread acceptance. It is believed that factors contributing to this situation include the excessive complexity of known antipollution rotary engines and continuing problems with sealing and wear.

Thus there is a need for a combustion engine that overcomes the disadvantages of the prior art.

SUMMARY

The present invention meets this need by providing one stage of combustion between a rotary compressor and a rotary motor, and another stage of combustion within the motor. In one aspect of the invention, the engine includes a rotary compressor having a first rotor rotatably mounted in a compressor housing having intake and exhaust ports thereof, and compressor seal means defining at least one compression chamber between the first rotor and the compressor housing, a periodic sequence of compressed gas being delivered from the compressor exhaust port in response to rotation of the first rotor; a rotary gas motor having a second rotor rotatably mounted in a motor housing having intake and exhaust ports thereof, and motor seal means defining at least one expansion chamber between the second rotor and the motor housing, a periodic sequence of expanded gas being delivered from the motor exhaust port with rotation of the second rotor in response to pressurized gas in the expansion chamber; an output shaft coupled to the first and second rotors for synchronized rotation thereof; a transfer passage fluid connected between the exhaust port of the compressor and the intake port of the motor, the transfer passage including a combustion chamber that is periodically pressurized by gas flow from the compressor exhaust port; means for admitting a combustible fuel into the combustion chamber; means for igniting the fuel in the combustion chamber, combustion occurring during expansion of gas from the combustion chamber into the expansion chamber; and means for expanding at least a portion of combustion products in the expansion chamber in pressure isolation from the combustion chamber, wherein the compressor and the output shaft are powered by combustion in the combustion chamber and further by combustion in the expansion chamber.

Preferably the first and second rotors are vane rotors, the compressor and motor seal means each including a pair of oppositely disposed vane members being slidably radially movable from opposite sides of each rotor for sealingly engaging cylindrical inside surfaces of the respective housings. Outside surfaces of the rotors can be circularly cylindrical, the corresponding housing inside surfaces also being circular in eccentric relation proximately tangent to the rotors, the vane members defining respective chord planes of the housing inside surfaces, the compressor and rotor seal means preventing gas flow between opposite sides of the chord planes.

Preferably the compressor and motor seal means include means coupled between the vane members for biasing the vane members toward the inside surfaces. Preferably the compressor and motor seal means further include respective sealing blocks supported for radial movement in the housing between the corresponding intake and exhaust ports, the blocks sealingly contacting the outside surfaces of the respective rotors, the vane members being coupled for limiting relative movement thereof to a total extended length that is less than a corresponding maximum length L of the respective chord plane for momentarily retracting each vane member within the associated rotor as it passes the corresponding sealing block, thereby avoiding impact between the vane members and the sealing blocks. The vane member pairs can each have a vane thickness, the sealing blocks each having a circumferential width greater than the corresponding vane thickness for bridging the respective rotors on opposite sides of passing vanes.

A single pair only of the vanes can be associated with each rotor. The engine can further include a first valve fluid connected in the transfer passage between the exhaust port of the compressor and the combustion chamber, the first valve being coupled to the output shaft for periodic operation synchronous with the first rotor between open and closed positions thereof, the closed position preventing upstream gas flow from the combustion chamber into the compressor. The engine can further include a second valve fluid connected in the transfer passage between the combustion chamber and the intake port of the motor, the second valve being coupled to the output shaft for periodic operation synchronous with the second rotor between open and closed positions thereof, the closed position preventing upstream gas flow from the motor into the combustion chamber. The transfer passage can be a first transfer passage, the combustion chamber being a first combustion chamber, the engine further including a second transfer passage and associated second combustion chamber connected between counterparts of the compressor exhaust port and the motor intake port, a third valve counterpart of the first valve, and a fourth valve counterpart of the second valve, an alternating sequence of gas flow in the transfer passages and combustion in the combustion chambers being supportable by operation of the first and second valves and of the third and fourth valves in complementary half-revolutions of the first and second rotors. The valves can be cam-actuated poppet valves.

In another aspect of the present invention, a device for converting between rotary motion and gas volume changes includes a vane rotor rotatably mounted in a housing having a cylindrical inside surface, intake and exhaust ports in fluid communication with the inside surface, the device having a pair of vane members slidably movable from opposite sides of a cylindrical outside surface of the rotor for sealingly contacting the inside surface of the housing, the inside surface being nearly tangent to the outside surface of the rotor and shaped for defining a chamber of changing volume within the housing in response to rotation of the rotor, a rotor seal member interrupting the inside surface near the point of tangency and being movably connected to the housing for sealing contact with the rotor, the vane members defining a chord plane of the inside surface and being coupled for limiting relative movement thereof to a total extended length that is less than a corresponding maximum length L of the chord plane for momentarily retracting each vane member within the rotor as it passes the seal member, thereby avoiding contact between the vane members and the seal member, rotation of the rotor being associated with a corresponding gas flow between the intake and exhaust ports. Preferably the seal member is circumferentially wider than a corresponding thickness of the vane members for permitting the seal member to smoothly contact the outside surface of the rotor on opposite sides of passing vane members. The device is operable as a compressor or as a motor.

DRAWINGS

These and other features, aspects, and advantages of the present invention will become better understood with reference to the following description, appended claims, and accompanying drawings, where:

DESCRIPTION

Figures 1, 2, 3:
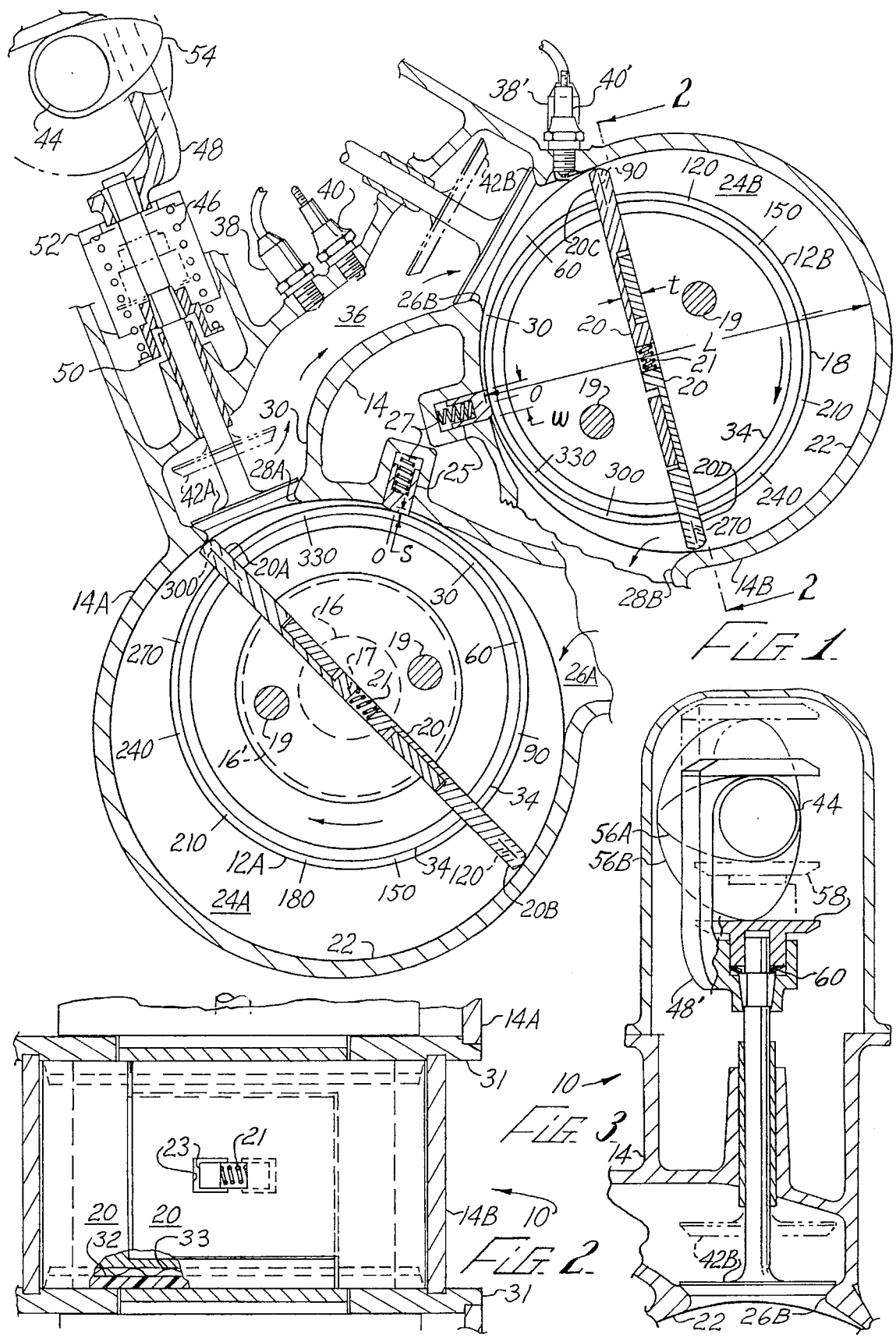
FIG. 1 is a partial sectional diagrammatic view of a stage combustion engine according to the present invention.
FIG. 2 is a sectional view of the engine of FIG. 1 on line 2—2 therein.
FIG. 3 is a fragmentary sectional view of a portion of the engine of FIG. 1.

The present invention is directed to a stage combustion rotary engine that is particularly simple and effective for reducing harmful emissions and wear. With reference to FIGS. 1–5 of the drawings, a rotary engine 10 includes a first rotor 12A that is rotatably supported in a first housing portion 14A of a housing 14, and a second rotor 12B that is likewise supported in a second housing portion 14B of the housing 14, the rotors (generally designated 12) being coupled to an output shaft 16 for rotation therewith. As shown in FIG. 2, an exemplary and preferred configuration of the engine 10 has the rotors 12 and the output shaft 16 rigidly connected on a common output axis 17, the rotors 12A and 12B, and the housing portions 14A and 14B being shown offset in FIG. 1 for clarity. For this purpose, and for maintaining structural integrity, the output shaft can be formed to include a flange portion 16', a pair of headed coupling rods 19 extending in parallel spaced relation to the output axis 17 through the rotors 12A and 12B and threadingly engaging the flange portion 16'.

Each of the rotors 12 is formed with a circularly cylindrical outside surface 18 that is interrupted by a radially movable pair of vane members 20 having a combined thickness t, the members of each pair being biased outwardly from opposite sides of the outside surface 18 by a vane spring 21 and being adapted for sealing sliding contact with the rotor 12 and with a cylindrical inside surface 22 of the corresponding housing portion 14A or 14B. Preferably, the vane members 20 of each pair are configured in complementary interlocking engagement, each of the vane members 20 extending beyond opposite ends of the (centrally located) vane spring 21 for at least partially counterbalancing the members 20 against centrifugal forces associated with rotation of the rotor 12, as shown in FIGS. 1 and 2. Further, the vane members 20 are coupled for limiting relative movement thereof to a total extended length that is slightly less than a maximum chord length (L in FIG. 1) between simultaneously contacted locations on the inside surface 22, the limiting movement being effected by contact between surfaces designated 23 in FIG. 2.

The first and second housing portions 14A and 14B have respective chambers 24A and 24B between the inside surfaces 22 and the outside surfaces 18 of the rotors 12, the chambers being sometimes referred to as compressor chamber 24A and motor chamber 24B. Thus the first rotor 12A, the first housing portion 14A, and the vane members 20 associated therewith function as a gas compressor, and the second rotor 12B, the second housing portion 14B, and the vane members 20 associated therewith function as a gas motor. Preferably, the compressor chamber 24A has a volume that is larger than that of the motor chamber 24B, an exemplary volume ratio of the chambers 24 being approximately 12:10.

The inside surfaces 22 of the housing 14 are generally cylindrical, i.e. each being generated by a straight line that moves parallel to a fixed line (the output axis 17 in the configurations described herein). Further, in the exemplary configurations of the engine 10, the inside surfaces 22 are circularly cylindrical in eccentric relation to the output axis 17, being nearly tangent to the respective outside surfaces 18 of the rotors 12 and having a clearance spacing s at the point of near tangency, the inside surfaces being interrupted thereat, a rotor seal member 25 being radially slidably retained in each of the housing portions 14A and 14B and biased into sealing contact with the respective rotor 12 by spring means 27. The rotor seal members 25 each have a circumferential width w that is greater than the thickness t of the vane members 20 for preventing the seal members 25 from extending below the outside surfaces 18 of the corresponding rotors 12 when the vane members 20 are passing the seal members 25, contact between the surfaces 23 of the vane members 20 effecting retraction of the passing vane member 20 below the outside surface 18 of the rotor 12 in response to centrifugal force associated with the other of the vane members 20 extending substantially beyond the outside surface 18 on the opposite side of the rotor 12 from the rotor seal member 25. Thus the vane members 20 are separated from the inside surface 22 for some distance on opposite sides of the rotor seal member 25 (in locations coincident with the port 26A or 26B and with the ports 28A or 28B, where sealing is not required). FIG. 1 is provided with angular indicia corresponding to respective positions of the vane members, designated 20A and 20B within the compressor chamber 24A, and of the vane members, designated 20C and 20D within the motor chamber 24B, the indicia representing 360° of clockwise rotation in 30° increments relative to the respective locations of the rotor seal members 25.

Each of the housing portions 14A and 14B is formed with an inlet port and an outlet port, the ports being in fluid communication with the corresponding chamber 24A or 24B, and respectively designated intake port 26A, compressor outlet 28A, motor inlet 26B, and exhaust port 28B. Also, a transfer passage 30 is fluid connected between the compressor outlet port 28A and the motor inlet port 26B for providing a closed gas path between the intake port 26A and the exhaust port 28B. It will be understood that while the transfer passage 30 is shown in FIG. 1 as forming a portion of the housing 14, separate members are contemplated, the housing portions 14A and 14B being also sealingly connected on opposite sides of a bulkhead member 31 as shown in FIG. 2. The housing 14 is provided with suitable cooling and lubricating systems (not shown).

Opposite side edges of each vane member 20 are formed for receiving respective vane seals 32 and an associated strip spring 33 for urging the associated seal 32 into sealing engagement with a corresponding one of the bulkhead members 31, a portion of each seal 32 also extending into sliding contact with a corresponding inside surface of the rotor 12 as shown in FIG. 2. Further sealing of the rotors 12 is provided by semicircular ring seals 34 that extend between the vane members 20 along opposite sides of each rotor 12 proximate the outside surface 18 thereof A combustion chamber 36 is defined within the transfer passage 30, the chamber 36 having a main fuel injector 38 and a main ignitor 40 in exposed therein, the injector 38 and the ignitor 40 being operative in a conventional manner for producing fuel combustion in the chamber 36 when pressurized air is present therein as described below. It will be understood that other means such as a carburetor upstream of the intake port 26A can be substituted for the injector 38. An important feature of the present invention is that combustion occurs in stages, both within the combustion chamber 36 and the motor chamber 24B for enhanced efficiency and reduced levels of harmful emissions. Accordingly, the engine 10 is preferably provided with an auxiliary ignitor 40' exposed within the motor chamber 24B for promoting (initiating and/or enhancing) the further combustion. Also, an auxiliary injector 38' can also be exposed within the motor chamber 24B for augmenting a concentration of unburned fuel entering the chamber 24B.

Preferably the engine 10 is implemented with a first valve 42A for periodically blocking gas flow from the combustion chamber 36 to the compressor chamber 24A, thereby limiting gas pressures and temperatures within the compressor chamber 24A and facilitating the sealing by and the longevity of the vane members 20 therein. Further, the presence of the first valve 42A makes practical the use of a single pair only of the vane members 20 in each of the housing portions 14A and 14B, thereby simplifying construction of the engine 10 and facilitating stage combustion by providing periodic combustion within the combustion chamber 36. It is also preferred that the engine 10 include a second valve 42B (the valves being collectively referred to as 42) for periodically blocking gas flow between the motor chamber 24B and the combustion chamber 36, thereby preventing compressed air entering the combustion chamber 36 from prematurely passing into the motor chamber 24B prior to combustion in the combustion chamber 24B, and preventing back-flow of gas from the motor chamber 24B into the combustion chamber 36. The valves 42 are configured as poppet valves for actuation by a cam shaft 44, the cam shaft 2 being coupled to the output shaft 16 by a timing belt drive 45. Contrary to conventional practice, the valves 42 have inverted seating faces, the first valve 42A being opened by the cam shaft 44 and being closed by a conventional valve spring 46. As shown in FIG. 1, the first valve 42A is coupled to the cam shaft 44 by a C-shaped cam follower 48, and the valve spring 46 is compressively loaded between an intermediately located spring flange 50 and a stationary hanger member 52, the valve 42A opening into the transfer passage 30 upon engagement of the follower 48 with a lobe 54 of the cam shaft 44.

As shown in FIG. 3, the second valve 42B is preferably "desmodromic," being both opened and closed by respective lobes of the cam shaft 44 designated opening lobe 56A and closing lobe 56B. A counterpart of the cam follower, designated 48', engages the opening lobe 56A of the cam shaft 44, the lobe 56A being axially displaced on the shaft 44 from alignment with the second valve 42B. The closing lobe 56B of the cam shaft 44 is coupled through a head member 58 and a coupling spring 60 to the valve 42B (the spring 60 bearing against keepers of the follower 48'), the spring 60 being configured as a high capacity bevel spring washer to provide sufficiently low-deflection and high-spring rate for holding the second valve 42B closed against back pressure from the motor chamber 24B that periodically exceeds the pressure within the combustion chamber 36.

Figure 4:
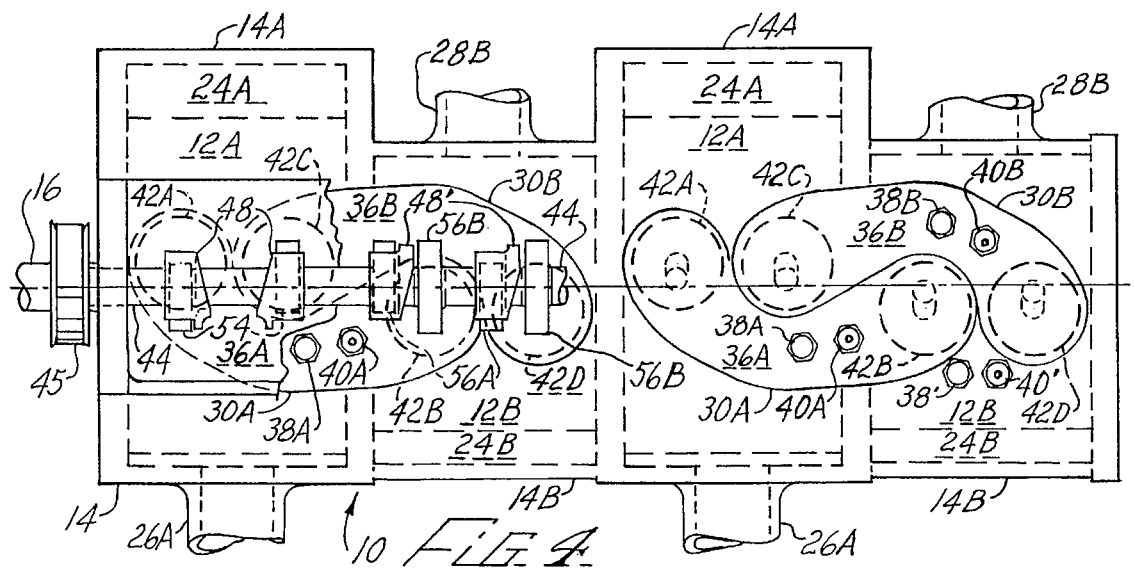
FIG. 4 is a fragmentary plan view of the engine of FIG. 1.

As shown in FIG. 4, a preferred configuration of the engine 10 includes, for each first rotor 12A and second rotor 12B, a pair of the transfer passages 30, designated first and second transfer passages 30A and 30B, and having associated first and second combustion chambers 36A and 36B. Further, the engine 10 in the configuration of FIG. 4 has a pair of the first rotors 12A together with a pair of the second rotors 12B in corresponding counterparts of the first and second housing portions 14A and 14B. Each of the second transfer passages 30A and 30B has associated therewith counterparts of the first and second valves 42A and 42B, respectively designated third valve 42C and fourth valve 42D, the valves 42C and 42D being actuated by the cam shaft 44 in a series sequence with the corresponding valves 42A and 42B for producing an alternating combustion sequence in the combustion chambers 36A and 36B. In the configuration of FIG. 4, each revolution of the output shaft 16 has associated therewith one complete combustion sequence for each of the combustion chambers 36, namely four, which corresponds to the number of combustion sequences per revolution of an eight-cylinder four-stroke cycle reciprocating engine, the rotors 12A being relatively phased at 90°, the rotors 12B being likewise phased at 90° for evenly spaced combustion sequences of the engine 10.

Figure 5:
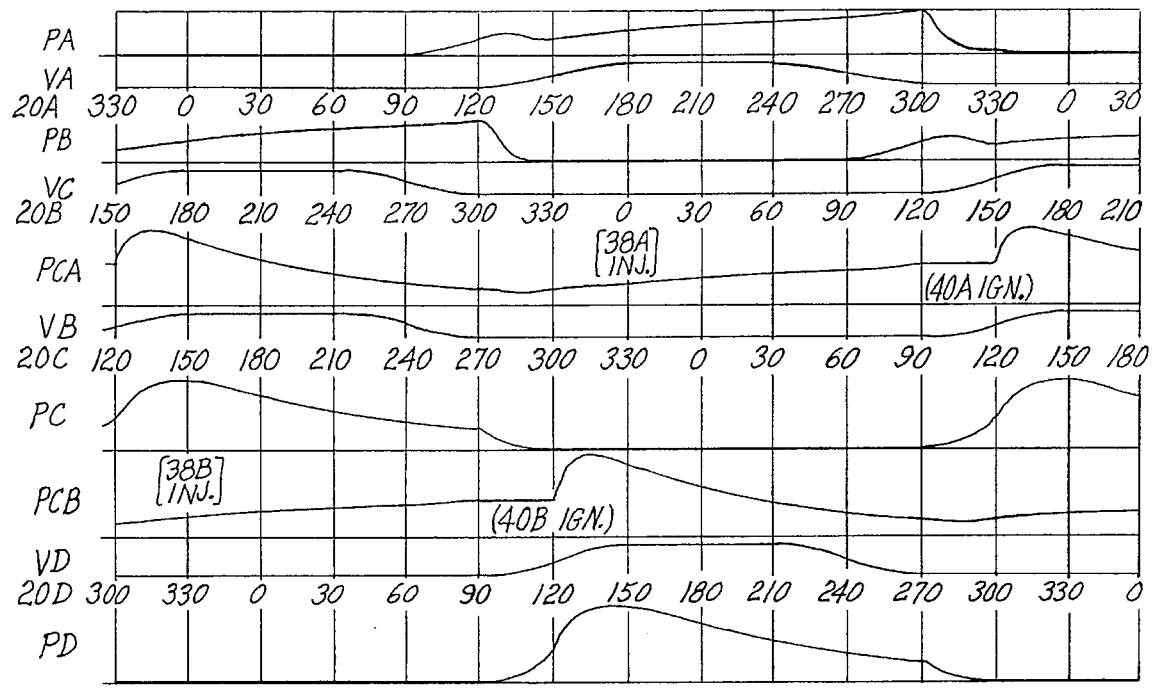
FIG. 5 is a timing chart for the engine of FIG. 1.

FIG. 5 shows an operating sequence of one associated pair of first and second rotors 12A and 12B of the engine 10 of FIG. 4, wherein PA represents pressure within the compressor chamber 24A ahead of the vane 20A and behind the rotor seal 25 thereof as a function of the angular position of the vane 20A and VA represents the position of the first valve 42A. Similarly, PB represents the pressure ahead of the vane 20B and VC represents the position of the third valve 42C. PCA represents the pressure within the first combustion chamber 36A, VB represents the position of the second valve 42B, and PC represents the pressure within the motor chamber 24B behind the vane 20C. Correspondingly, PCB represents the pressure within the second combustion chamber 36A, VD represents the position of the fourth valve 42D, and PD represents the pressure behind the vane 20D. As shown in FIG. 5, PA begins increasing when the vane 20A completes traverse of the intake port 26A, the pressure falling slightly as the first valve 42A (VA) begins opening following traverse of the compressor outlet port 28A by the second vane 20B (when the first vane 20A passes 120°), the pressure thenceforth building up in the combination of the compressor chamber 24A (PA) and the first combustion chamber 36A (PCA) until the first vane 20A reaches 300° at closure of the first valve 42A (VA), the first main injector 38A being activated approximately at the 180° position of the first vane 20A. Following closure of the first valve 42A, and after the second valve 42B begins opening, the first main ignitor 40A is activated for initiating combustion within the combustion chamber 36A, thereby pressurizing the motor chamber 24B behind the third vane 20C (principally at approximately the 120° position thereof). The pressure PC behind the third vane 20C continues (diminishing) for driving the output shaft 16 until the vane 20C begins to traverse the exhaust port 28B (following the 270° position of the third vane 20C). In complementary fashion, the pressures PB, PCB and PD are phased 180° from the above-described pressures PA, PCA and PC in response to operation of the second vane 20B, the third and fourth valves 42C and 42D, the second main injector and ignitor 38B and 40B, and the fourth vane 20D, the pressures PCA, PCB, PC and PD being augmented by continuous operation of the auxiliary injector 38' (if present) and the auxiliary ignitor 40'. An important feature of the present invention is that the combustion is within expanding volumes associated with the motor chamber 24B alone and in combination with the combustion chambers 36A and 36B. Thus an initial stage of combustion occurs primarily within successive ones of the combustion chambers 36, and a final stage of combustion occurs substantially confined within the motor chamber 24B. Accordingly, the combustion is at temperatures and pressures considerably lower than corresponding maxima that are associated with constant volume combustion such as that associated with reciprocating piston engines, with consequent reductions in the concentrations of polluting combustion products. This staged combustion is facilitated by the use of the valves 42, particularly in the preferred configuration having the alternating combustion sequence in the first and second combustion chambers 36A and 36B. In the preferred configuration, the motor chamber 24B is pressure isolated from one of the associated combustion chambers 36, the compression chamber 24A being isolated from the other of the combustion chambers 36, the chambers 36 being alternately fluid connected to the respective chambers 24A and 24B.

Although the present invention has been described in considerable detail with reference to certain preferred versions thereof, other versions are possible. For example, it is possible to provide only one of the transfer passages 30 and associated combustion chamber 36 between the compressor and motor chambers 24A and 24B, the valves 42A and 42B being operated twice in each revolution of the rotors 12. Also, the first and second rotors 12A and 12B can be on separate counter-rotating shafts that are gear-coupled, the second valve 42B being located generally between the rotors 12. Therefore, the spirit and scope of the appended claims should not necessarily be limited to the description of the preferred versions contained herein.

What is claimed is:

1. A stage combustion rotary engine comprising:
   (a) a rotary compressor having a first rotor rotatably mounted in a compressor housing having intake and exhaust ports thereof, and compressor seal means contacting the first rotor and the compressor housing for defining at least one compression chamber between the first rotor and the compressor housing, a periodic sequence of compressed gas being delivered from the compressor exhaust port in response to rotation of the first rotor;
   (b) a rotary gas motor having a second rotor rotatably mounted in a motor housing having intake and exhaust ports thereof, and motor seal means contacting the second rotor and the motor housing for defining at least one expansion chamber between the second rotor and the motor housing, a periodic sequence of expanded gas being delivered from the motor exhaust port with rotation of the second rotor in response to pressurized gas in the expansion chamber;
   (c) an output shaft coupled to the first and second rotors for synchronized rotation thereof;
   (d) a transfer passage fluid-connected between the exhaust port of the compressor and the intake port of the motor, the transfer passage including a combustion chamber, the combustion chamber being periodically pressurized by gas flow from the compressor exhaust port;
   (e) means for admitting a combustible fuel into the combustion chamber;
   (f) means for igniting the fuel in the combustion chamber, combustion occurring during expansion of gas from the combustion chamber into the expansion chamber; and
   (g) means for isolating the combustion products in the combustion chamber and in the expansion chamber from the compression chamber during expansion thereof,
   wherein at least one of the first and second rotors is a vane rotor having a cylindrical outside surface, the corresponding housing being a vane housing having a cylindrical inside surface, and wherein:
   (i) the seal means comprises a pair of vane members slidably carried by the vane rotor, the inside surface of the vane housing being proximately tangent to outside surface of the vane rotor and shaped for defining a chamber of changing volume within the vane housing in response to rotation of the vane rotor, the vane members movably projecting from the outside surface of the vane rotor in a chord plane of the inside surface for sealingly contacting the inside surface of the vane housing opposite the intake and exhaust ports from the point of proximate tangency, the vane members also having interlocking contact surfaces for limiting a combined chordal length of the pair to a maximum extended length; and
   (ii) a rotor seal member is movably connected to the vane housing in interrupting relation to the inside surface of the vane housing proximate the point of tangency for sealing contact with the vane rotor, the maximum extended length of the vane members being less than a corresponding maximum length L of the chord plane for momentarily retracting each vane member within the vane rotor as that vane member passes the seal member in response to the other member of the pair being centrifugally forced against the inside surface of the housing opposite the rotor seal member, thereby avoiding contact between the vane members and the seal member, and
   wherein the compressor and the output shaft are powered by combustion in the combustion chamber and expansion in the expansion chamber.

2. The engine of claim 1, wherein the first and second rotors are vane rotors, the compressor and motor seal means each comprising counterparts of the vane members and the rotor seal member.

3. The engine of claim 2, wherein respective outside surfaces of the rotors are circularly cylindrical, the corresponding housing inside surfaces also being circular in eccentric relation proximately tangent to the respective rotors, the compressor and motor seal means preventing gas flow between opposite sides of the chord planes.

4. The engine of claim 3, wherein the compressor and motor seal means comprise means coupled directly between the vane members for biasing the vane members toward the maximum extended length.

5. The engine of claim 1, wherein each pair of the vane members has a vane thickness, the sealing blocks each having a circumferential width greater than the corresponding vane thickness for bridging the respective rotor on opposite sides of passing vanes.

6. The engine of claim 2, wherein a single pair only of the vanes is associated with each rotor.

7. The engine of claim 1, wherein the means for isolating comprises a first valve fluid-connected in the transfer passage between the exhaust port of the compressor and the combustion chamber, the first valve being coupled to the output shaft for periodic operation synchronous with the first rotor between open and closed positions thereof, the closed position preventing upstream gas flow from the combustion chamber into the compressor.

8. The engine of claim 7, further comprising a second valve fluid connected in the transfer passage between the combustion chamber and the intake port of the motor, the second valve being coupled to the output shaft for periodic operation synchronous with the second rotor between open and closed positions thereof, the closed position preventing upstream gas flow from the motor into the combustion chamber.

9. The engine of claim 8, wherein the transfer passage is a first transfer passage and the combustion chamber is a first combustion chamber, the engine further comprising a second transfer passage and associated second combustion chamber connected between counterparts of the compressor exhaust port and the motor intake port, a third valve counterpart of the first valve, and a fourth valve counterpart of the second valve, an alternating sequence of gas flow in the transfer passages and combustion in the combustion chambers being supportable by operation of the first and second valves and of the third and fourth valves in complementary half-revolutions of the first and second rotors.

10. The engine of claim 9, wherein the valves are cam-actuated poppet valves.

11. A stage combustion rotary engine comprising:

(a) a rotary compressor having a first vane rotor rotatably mounted in a compressor housing having an intake port and a pair of exhaust ports, and compressor seal means defining at least one compression chamber between the first vane rotor and the compressor housing, a periodic sequence of compressed gas being delivered from the compressor exhaust port in response to rotation of the first vane rotor;

(b) a rotary gas motor having a second vane rotor rotatably mounted in a motor housing having a pair of intake ports and an exhaust port, and motor seal means defining at least one expansion chamber between the second vane rotor and the motor housing, a periodic sequence of expanded gas being delivered from the motor exhaust port with rotation of the second vane rotor in response to pressurized gas in the expansion chamber, the compressor and motor seal means each comprising a single pair of oppositely disposed vane members being slidably radially movable from opposite sides of each rotor for sealingly engaging cylindrical inside surfaces of the respective housings, outside surfaces of each rotor being circularly cylindrical, the housing inside surfaces also being circular in eccentric relation proximately tangent to the corresponding rotors, the vane members having interlocking contact surfaces for limiting relative movement thereof to a maximum extended length, the compressor and motor seal means further comprising respective sealing blocks supported for radial movement in the compressor and motor housings between the corresponding intake and exhaust ports, the blocks sealingly contacting the outside surfaces of the rotors proximate the point of tangency, the maximum extended length of the vane members being less than a maximum length L of the chord plane, each vane member being momentarily retracted within the respective rotor by centrifugal force associated with the paired vane member for passage proximate the corresponding sealing block without contact therewith, the maximum extended length of the vane members bring sufficient for permitting sealing contact between locations on the housing inside surface opposite the intake and exhaust ports from the sealing block;

(c) an output shaft coupled to the first and second vane rotors for synchronized rotation thereof;

(d) first and second transfer passages fluid connected between respective exhaust ports of the compressor and intake ports of the motor, first and second combustion chambers being formed within the respective transfer passages, the combustion chambers being periodically sequentially pressurized by gas flow from the compressor exhaust ports;

(e) first and third cam-actuated poppet valves fluid connected in the first and second transfer passages between the respective exhaust ports of the compressor and the corresponding combustion chambers, the first and third valves being coupled to the output shaft for periodic operation synchronous with the first rotor between open and closed positions thereof, the closed position preventing upstream gas flow from the respective combustion chambers into the compressor;

(f) means for admitting a combustible fuel into the combustion chambers;

(g) second and fourth cam-actuated poppet valves fluid connected in the first and second transfer passages between the respective combustion chambers and the intake ports of the motor, the second and fourth valves being coupled to the output shaft for periodic operation synchronous with the second vane rotor between open and closed positions thereof, the closed position preventing upstream gas flow from the motor into the respective combustion chambers; and (h) means for igniting the fuel in the combustion chambers, an alternating sequence of gas flow in the transfer passages and combustion in the combustion chambers being supportable by operation of the first and second valves and of the third and fourth valves in complementary half-revolutions of the first and second rotors, combustion occurring during expansion of gas from one of the combustion chambers into the expansion chamber in pressure isolation from the other combustion chamber, wherein the compressor and the output shaft are powered by combustion in the combustion chambers and further by combustion in the expansion chamber.

* * * * *